United States Patent [19]

Taylor

[11] Patent Number: 5,025,832
[45] Date of Patent: Jun. 25, 1991

[54] MULTIPLE ORIFICE ROTATABLE DISC IN-LINE RESTRICTOR VALVE

[76] Inventor: Julian S. Taylor, 8300 SW. 8th, Oklahoma City, Okla. 73128

[21] Appl. No.: 582,731

[22] Filed: Sep. 14, 1990

[51] Int. Cl.[5] .............................................. F16K 3/08
[52] U.S. Cl. .................................. 137/625.31; 251/208
[58] Field of Search ..................... 251/208; 137/625.31

[56] References Cited

U.S. PATENT DOCUMENTS

| | | | |
|---|---|---|---|
| 3,426,797 | 2/1969 | Baker | 137/625.31 |
| 4,098,294 | 7/1978 | Woods | 137/625.31 X |
| 4,944,330 | 7/1990 | Sakakibara et al. | 137/625.31 |

Primary Examiner—Arnold Rosenthal
Attorney, Agent, or Firm—Robert K. Rhea

[57] ABSTRACT

A multiple orifice rotatable disc in-line restrictor valve is formed by a cylindrical valve body having a flow passageway therethrough. The valve body is step diameter counterbored from one end for receiving a pair of multiple orifice discs and a disc rotating barrel with one of the discs pinned to the barrel and rotated by a handle projecting radially outward of the valve body through a 90° slot in the body wall for manually positioning one disc relative to the other in orifice mated or mismated position.

12 Claims, 2 Drawing Sheets

MULTIPLE ORIFICE ROTATABLE DISC IN-LINE RESTRICTOR VALVE

BACKGROUND OF THE INVENTION

1. Field of the invention

This invention relates to fluid flow restrictor valves and more particularly to an in-line valve having discs mating and mismating orifices in a flow passageway.

In the interest of economy the oil industry at present generally relies heavily on a line of valves for restricting fluid flow commonly called "ball valves."

This type of valve functions quite satisfactorily, for the most part, in restricting fluid flow at pressures below 300 psi differential pressure but has the disadvantage that flow passageways formed through the ball portion of the valve impinge against the valve sealing surface of the body so that the valve has a relatively short sealing life. Therefore, the useful life of such valves is relatively short. Abrasives in the fluid rapidly wear the fluid passageways resulting in a fluid leaking valve since the ball fluid passageways cannot be satisfactorily sealed.

This invention provides an in-line valve body which houses a pair of multiple orifice rotatable discs with one disc being rotatable relative to the other for aligning and misaligning the disc ports and controlling the fluid flow.

2. Description of the prior art.

Multiple orifice discs are well known for their feature of controlling fluid flow; however, since one of the discs must be stationary and the other pinned to an angularly rotatable part, necessary control components have heretofore failed to provide a competitively priced flow restrictor valve.

This invention solves the pinned disc rotating problem by providing a cylindrical disc rotator having diametrically offset bores therethrough providing sufficient axial area for receiving pins secured to one disc and controlling its angular rotation relative to the other disc resulting in a 2 inch NPT valve with a fluid flow Cv rating of over 20.

SUMMARY OF THE INVENTION

A centrally bored cylindrical valve body, having opposing end portions adapted to be inserted in a pipeline, is step diameter counterbored from its upstream end portion for receiving a pair of juxtaposed multiple orifice discs adjacent the downstream end portion of the valve body.

A cylindrical disc rotating barrel having dual diametrically offset longitudinal bores is rotatably received by the upstream end portion of the valve body and pinned to the upstream disc. A 90° slot in the valve body slidably receives one end portion of a laterally projecting control handle threadedly connected at its inner end with the barrel for angular rotation of the latter and the connected disc for mating and mismating disc orifices.

The principal object is to provide an in-line multiple orifice rotatable disc restrictor valve having discs that by their nature isolate the final disc face seal from fluid flow through the valve which may be relatively economically manufactured and which will permit a substantially greater volume of fluid flow so that they compete in the market place with ball valves of comparable size.

DESCRIPTION OF THE PREFERRED EMBODIMENTS

Figure 1:
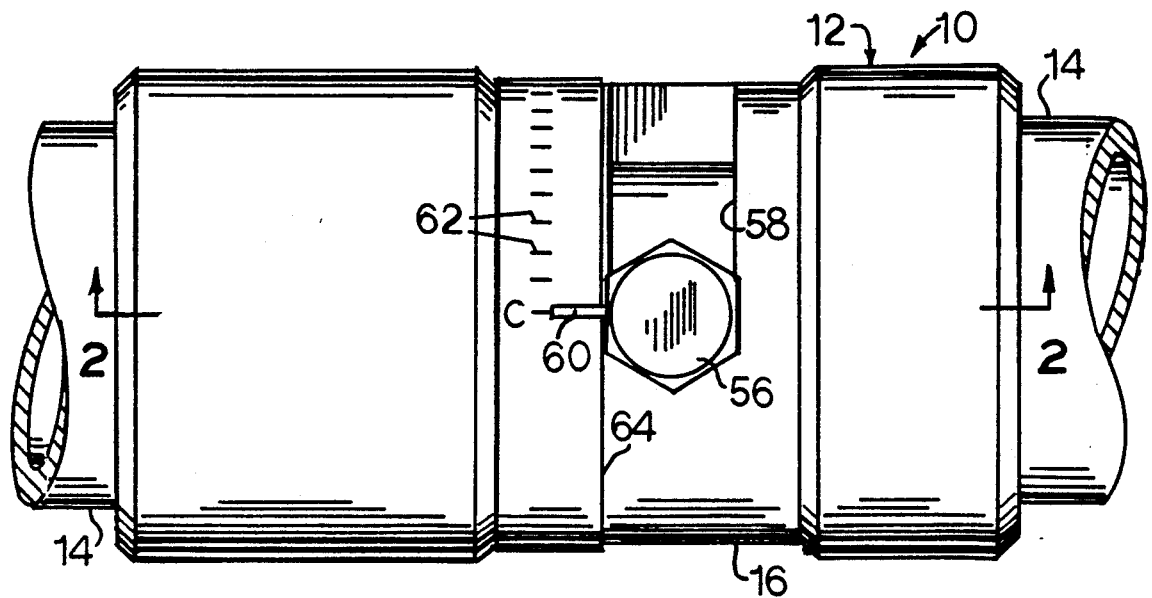
FIG. 1 is a top view of the valve in fluid passageway closed position, connected with a fragment of a pipeline.

Like characters of reference designate like parts in those figures of the drawings in which they occur.

In the drawings:

The reference numeral 10 indicates the valve as a whole comprising a cylindrical body 12 having threaded ends for insertion in a pipeline 14. Intermediate its ends the valve body is diametrically reduced, as at 16, for the purpose presently apparent.

Figure 3:
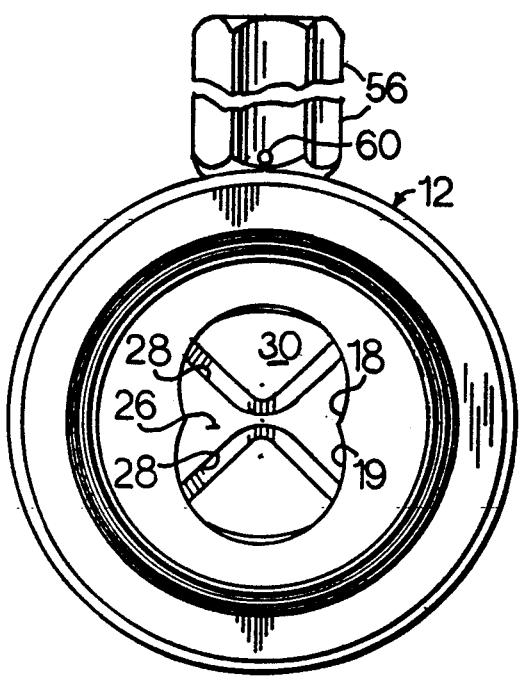
FIG. 3 is a left end elevational view of FIG. 2.

The valve body is axially bored from one end with diametrically offset mutually intersecting dual bores, as at 18 and 19, to form a flow passageway, substantially figure eight-shaped in end view (FIG. 3) and step diameter counterbored from its other end portion as at 20,22 and 24.

Figure 6:
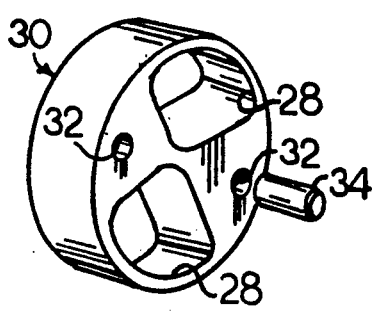
FIG. 6 is a perspective view of one of the discs, per se.
Figure 5:
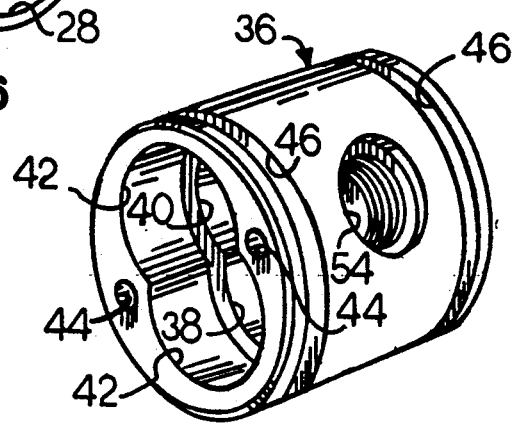
FIG. 5 is a perspective view of the barrel, per se.

The counterbore 24 receives a ceramic or case hardened metal disc 26 having a pair of orifices 28 and having its periphery sealed by an O-ring 29 recessed in the counterbore wall 24. The orifices 28 are substantially pie-shaped (FIG. 6) and are disposed diametrically opposite each other. The combined cross section area encompassed by the disc orifices 28 preferably being about 40% of the total area circumscribed by the disc perimeter.

The counterbore 22 receives a cooperating disc 30 in face-to-face contiguous contact with the disc 26 and having identical orifices for mating and mismating with the orifices 28 in the disc 26. The disc 30 is further provided with a pair of sockets 32 for receiving a pair of pins 34.

Figure 4:
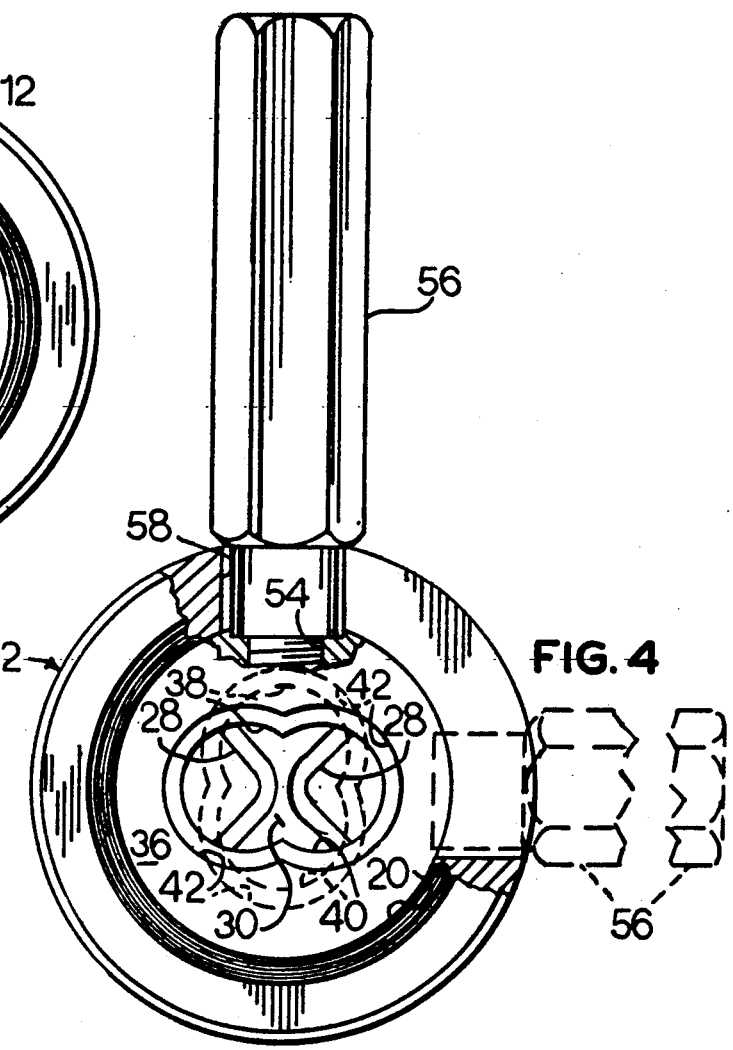
FIG. 4 is a right end elevational view of FIG. 2 illustrating, by dotted lines, the barrel disposed in fluid passageway full open position.

The counterbore 20 axially receives a cylindrical disc rotating barrel 36 which is similarly axially provided with dual bores 38 and 40 (FIG. 4) of selected diameter disposed in diametrically offset and intersecting relation forming a substantially figure eight-shaped 41 (FIG. 4), when viewed from either end of the barrel.

The barrel bores 38 and 40 are counterbored on a diameter equal with the body bores 18 and 19, as at 42, from respective ends of the barrel. The end surface of the barrel facing the disc 30 is provided with a pair of sockets 44 adjacent the narrow part of the figure eight-shape bore for cooperatively receiving one end portion of the pins 34 opposite the disc 30, thus securing the barrel to the disc 30. The disc 26 is similarly pinned by pins, not shown, to the body upstream surface containing the figure eight-shape dual bores 18 and 19 in the body downstream end portion and referenced to it.

Annular grooves 46 are formed in the periphery of respective end portions of the barrel for receiving O-ring seals 48 and sealing the periphery of the barrel wall with the counterbore wall 20. Intermediate its ends the counterbore wall 20 is further recessed as at 50 to provide a fluid sump having a drain hole 52. Opposite the drain hole 52 the barrel is radially bored and threaded, as at 54, for receiving one end portion of a handle 56 projecting radially outward of the valve body wall through a slot 58 extending through an arc of substantially 90° formed in the wall of the valve body.

An indicator 60, horizontally secured to the handle 56 adjacent the valve body, registers with indicia 62 scored on a band 64 surrounding the valve body in its recess 16 for indicating the position of the disc apertures 28 relative to each other from a mismated position (FIG. 2) to a mated full open position of the flow passageway, indicated by the broken lines

OPERATION

Operation seems obvious from the above description but briefly stated, the valve 10 is assembled and installed in the line 14 as described hereinabove.

Figure 2:
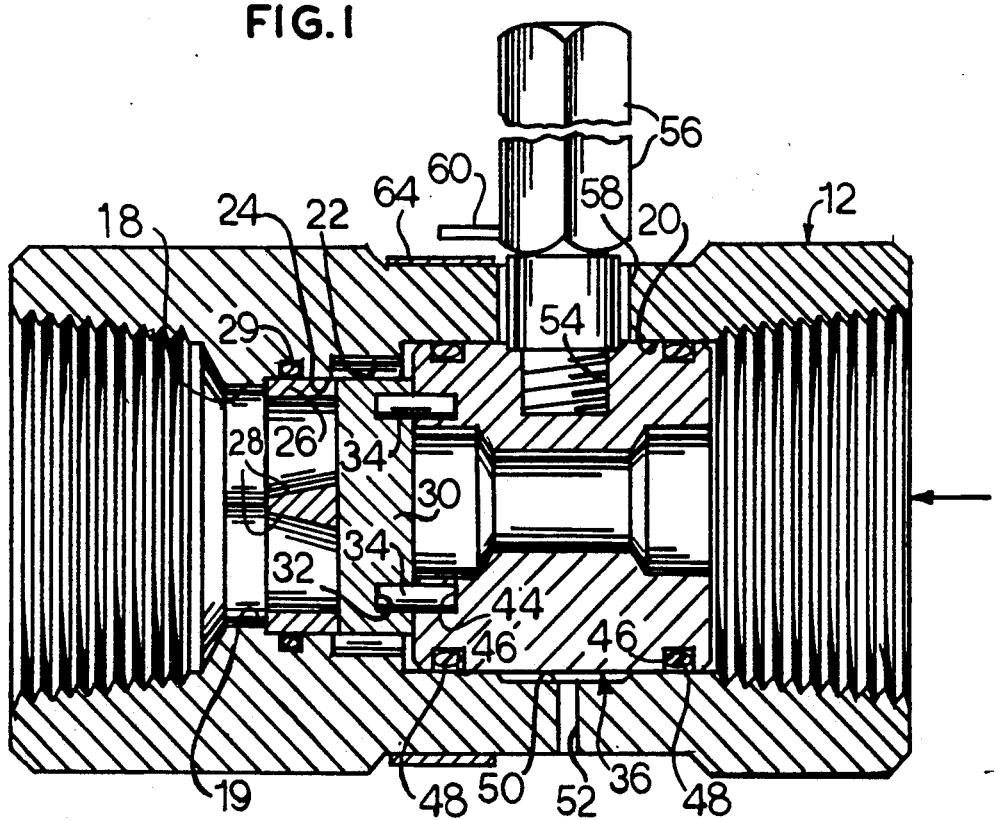
FIG. 2 is a vertical cross-sectional view taken substantially along the line 2-2 of FIG. 1.

In the position shown by FIGS. 1 and 2, the discs 26 and 30 have their orifices 28 mismated and fluid flow through the valve is completely interrupted. By manually moving the handle 56 clockwise toward its dotted line position of FIG. 4, the orifices or apertures of the discs 26 and 30 are partially mated as the handle is initially moved and are fully mated when the handle has been moved 90°. When in mated position the disc apertures 28 are in cooperative alignment with the enlarged portions of the figure eight bores in the body and barrel.

The resilience of the O-rings 48 maintain the disc rotating barrel 36 in the angular position desired. Since the O-rings 48 isolate the discs from the fluid int he passageway, the perimeters of the discs are not subject to abrasive fluid wear.

When the discs orifices and/or the barrel bores become worn, as by abrasives in the fluid, the valve may be separated from the line 14, the handle removed and the barrel and both discs easily replaced by new components including the O-rings and reassembled in the flow line 14.

Obviously the invention is susceptible to changes or alterations without defeating its practicability. Therefore, I do not wish to be confined to the preferred embodiment shown in the drawings and described herein.

I claim:

1. An in-line fluid flow restrictor valve, comprising:
    an elongated valve body having a longitudinal flow passageway and having first and second counterbores in its upstream end portion;
    pair of multiple orifice discs axially disposed in juxtaposed face-to-face contiguous contacting relation within the first counterbore;
    a barrel axially disposed within the second counterbore, said barrel having a pair of axial diametrically offset
        mutually intersecting longitudinal bores for forming the upstream end portion of the flow passageway;
    pin means for securing said barrel to the upstream disc; and,
        means for angularly rotating the barrel relative to the body and mating and mismating the orifices in said discs.

2. The restrictor valve according to claim 1 in which said barrel offset bores are counterbored from each end.

3. The restrictor valve according to claim 2 in which the combined flow passageway area of the respective disc orifices is not less than 40° or greater than 50° of the cross section area circumscribed by the perimeter of the respective disc.

4. The restrictor valve according to claim 3 in which the diametric spacing between the barrel offset bores is between 50% and 60% of the diameter of the respective offset bore.

5. An in-line fluid flow restrictor valve, comprising:
    an elongated valve body having a pair of axial diametrically offset mutually intersecting longitudinal bores for forming the downstream end portion of a flow passageway and having first and second counterbores in its upstream end portion;
    a pair of multiple orifice discs axially disposed in juxtaposed face-to-face contiguous contacting relation within the first counterbore;
    a barrel axially disposed within the second counterbore,
    said barrel having a pair of axial diametrically offset mutually intersecting longitudinal bores for forming the upstream end portion of the flow passageway;
    pin means for securing said barrel to the upstream disc; and,
    means for angularly rotating the barrel relative to the body and mating and mismating the orifices in said discs.

6. The restrictor valve according to claim 5 in which said barrel offset bores are counterbored from each end.

7. The restrictor valve according to claim 6 in which the combined flow passageway area of the respective disc orifices is not less than 40° or greater than 50° of the cross section area circumscribed by the perimeter of the respective disc.

8. The restrictor valve according to claim 7 in which the disc orifices are substantially pie-shaped and disposed in diametric opposition and in which the diametric spacing between the offset bores is between 50% and 60% of the diameter of the respective offset bore.

9. An in-line fluid flow restrictor valve, comprising:
    an elongated valve body having a pair of axial diametrically offset mutually intersecting longitudinal bores for forming the downstream end portion of a flow passageway substantially figure eight-shaped in transverse cross section and having first and second counterbores in its upstream end portion;
    a pair of multiple orifice discs axially disposed in juxtaposed face-to-face contiguous contacting relation with in the first counterbore;
    a barrel axially disposed within the second counterbore,
    said barrel having a pair of axial diametrically offset mutually intersecting longitudinal bores for forming the upstream end portion of a substantially figure eight-shaped in transverse cross section flow passageway;
    pin means for securing said barrel to the upstream disc; and,
    means for angularly rotating the barrel relative to the body and mating and mismating the orifices in said disc.

10. The restrictor valve according to claim 9 in which said barrel offset bores are counterbored from each end on diameters equal with the diameters of the body dual bores.

11. The restrictor valve according to claim 10 in which the combined flow passageway area of the respective disc orifices is not less than 40° or greater than 50° of the cross section area circumscribed by the perimeter of the respective disc.

12. The restrictor valve according to claim 11 in which the disc orifices are substantially pie-shaped and disposed in diametric opposition for figure eight fluid flow passageway cooperation when in aligned relation and in which the diametric spacing between the offset bores is between 50° and 60° of the diameter of the respective off bore.

* * * * *